(12) United States Patent
Patrick

(10) Patent No.: US 9,071,191 B2
(45) Date of Patent: Jun. 30, 2015

(54) PREFABRICATED SOLAR ARRAY SYSTEM

(76) Inventor: John L Patrick, Chagrin Falls, OH (US)

( * ) Notice: Subject to any disclaimer, the term of this patent is extended or adjusted under 35 U.S.C. 154(b) by 787 days.

(21) Appl. No.: 13/338,458

(22) Filed: Dec. 28, 2011

(65) Prior Publication Data

US 2013/0169054 A1    Jul. 4, 2013

(51) Int. Cl.
| | | |
|---|---|---|
| *H02J 1/00* | (2006.01) | |
| *H02J 3/00* | (2006.01) | |
| *H02S 40/32* | (2014.01) | |
| *H02S 30/20* | (2014.01) | |
| *F24J 2/52* | (2006.01) | |
| *H02J 3/38* | (2006.01) | |
| *F24J 2/54* | (2006.01) | |

(52) U.S. Cl.
CPC ............ *H02S 40/32* (2014.12); *Y10T 307/707* (2015.04); *H02J 3/383* (2013.01); *H02S 30/20* (2014.12); *F24J 2/5262* (2013.01); *F24J 2002/5277* (2013.01); *F24J 2002/5486* (2013.01); *Y02E 10/47* (2013.01); *Y02E 10/563* (2013.01)

(58) Field of Classification Search
CPC ............ H02J 1/102; H02J 3/36; H02J 1/10; H02J 1/08; H02J 3/382

USPC ............... 307/82, 43, 80, 46, 48; 363/97, 95; 136/244, 246, 245, 240
See application file for complete search history.

(56) References Cited

U.S. PATENT DOCUMENTS

| | | | | |
|---|---|---|---|---|
| 2010/0277002 | A1* | 11/2010 | Folts et al. ........................ | 307/82 |
| 2010/0286836 | A1* | 11/2010 | Shaver et al. .................. | 700/287 |
| 2011/0012430 | A1* | 1/2011 | Cheng et al. ..................... | 307/82 |
| 2012/0019074 | A1* | 1/2012 | Frolov et al. .................... | 307/82 |
| 2012/0090659 | A1* | 4/2012 | Muchow et al. .............. | 136/245 |

* cited by examiner

Primary Examiner — Rexford Barnie
Assistant Examiner — Jagdeep Dhillon

(57) ABSTRACT

In one embodiment, a solar array system is described. The example solar array system is prefabricated as a single unit. The solar array system includes a plurality of solar panels. The solar panels of the plurality of solar panels are configured to be electrically connected to one another. At least one solar panel of the plurality of solar panels is electrically connected to a mini-inverter. The mini-inverter is configured to perform maximum power point tracking (MPPT) and apply a load to at least one solar panel of the plurality of solar panels. The mini-inverter is also configured to convert direct current (DC) power generated by the plurality of solar panels to alternating current (AC) power. The solar array system further includes a plurality of locking hinges. The locking hinges are configured to allow the plurality of solar panels to be folded on top of one another.

5 Claims, 3 Drawing Sheets

PREFABRICATED SOLAR ARRAY SYSTEM

BACKGROUND

In 1998 the Department of Housing and Urban Development commissioned a study by the National Association of Home Builders Research Center (NAHBRC) on housing trends. As part of that study the NAHBRC compared the cost of a house constructed on site, called "stick built," to an identical house that was prefabricated, where prefabricated is defined as 98% of the house being factory built. The conclusion was that the construction cost of the prefabricated house was approximately 43% lower than an identical stick house. Given the relative difficulty of roof based labor, the savings for reducing roof based labor may be greater than the average savings on home construction. Thus, prefabrication is an important field for installed solar array system cost reductions.

In addition to installing solar array systems on prefabricated structures, solar array systems are installed on sites such as existing residential and commercial buildings. A number of issues arise with the logistics of shipping a solar array system to sites. The prefabricated sections of the solar array system must be small enough and light enough to ship to the site and install without resulting in additional costs and labor. For example, common ladder based power conveyors will move approximately 350 pounds. Therefore, a solar array system weighing less than 350 pounds would be desirable because the solar array system would be capable of being transported by a common ladder based power conveyor. Furthermore, even if the solar array system is within an acceptable weight range, the size of the solar system array must be manageable for laborers working on a roof. The ability to fold the array into a reasonable size also affects transportation to the work site by common carrier. For example, local installers may use pick-up trucks or small box trucks for local delivery. Therefore, having a smaller package size that is compatible with vehicles of this size may enhance results.

Solar arrays consist of a set of solar panels. Solar panels are a type of photovoltaic cell. A photovoltaic cell is a semiconductor device that converts the energy of light into electricity using the photovoltaic effect. When light shines on a photovoltaic cell, a voltage develops across the cell. The voltage results in a current when a load is electrically connected to the photovoltaic cell. The voltage and current vary according to environmental factors (e.g., the amount of light shown on the photovoltaic cell, the temperature of the photovoltaic cell) and design characteristics (e.g., dimensions of the photovoltaic cells, materials to used to construct the photovoltaic cell) of the photovoltaic cell.

To get the maximum power from the solar array system, an inverter associated With the solar arrays typically employs maximum power point tracking (MPPT). Individual solar panels have a complex relationship with other panels in the solar array system due to variations in the environmental factors and design characteristics. The differences in the individual solar panels can drag down the efficiency of the entire solar array system. In fact, when connected in a string configuration (e.g., series connection) the output of each solar panel is limited to the output of the lowest performing solar panel in the string. The output of the array of N panels is then N times the output of the lowest performing panel.

Furthermore, the individual panels are typically Wired to an inverter using direct current (DC) cabling. DC cables are used in the field because photovoltaic cells are semiconductor devices and semiconductor devices are DC devices. To outfit the solar array system in the field would require additional materials (e.g., devices, cabling) and require additional time and labor. Furthermore, it is difficult to install the individual elements in the field because the individual elements must be individually shipped, amassed onsite (e.g., rooftop), and installed on site. The individual elements may need to be individually tested to ensure that they operate correctly with the system. There are a number of challenges to creating a solar system array that is practical from a shipping, installation, and setup perspective.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
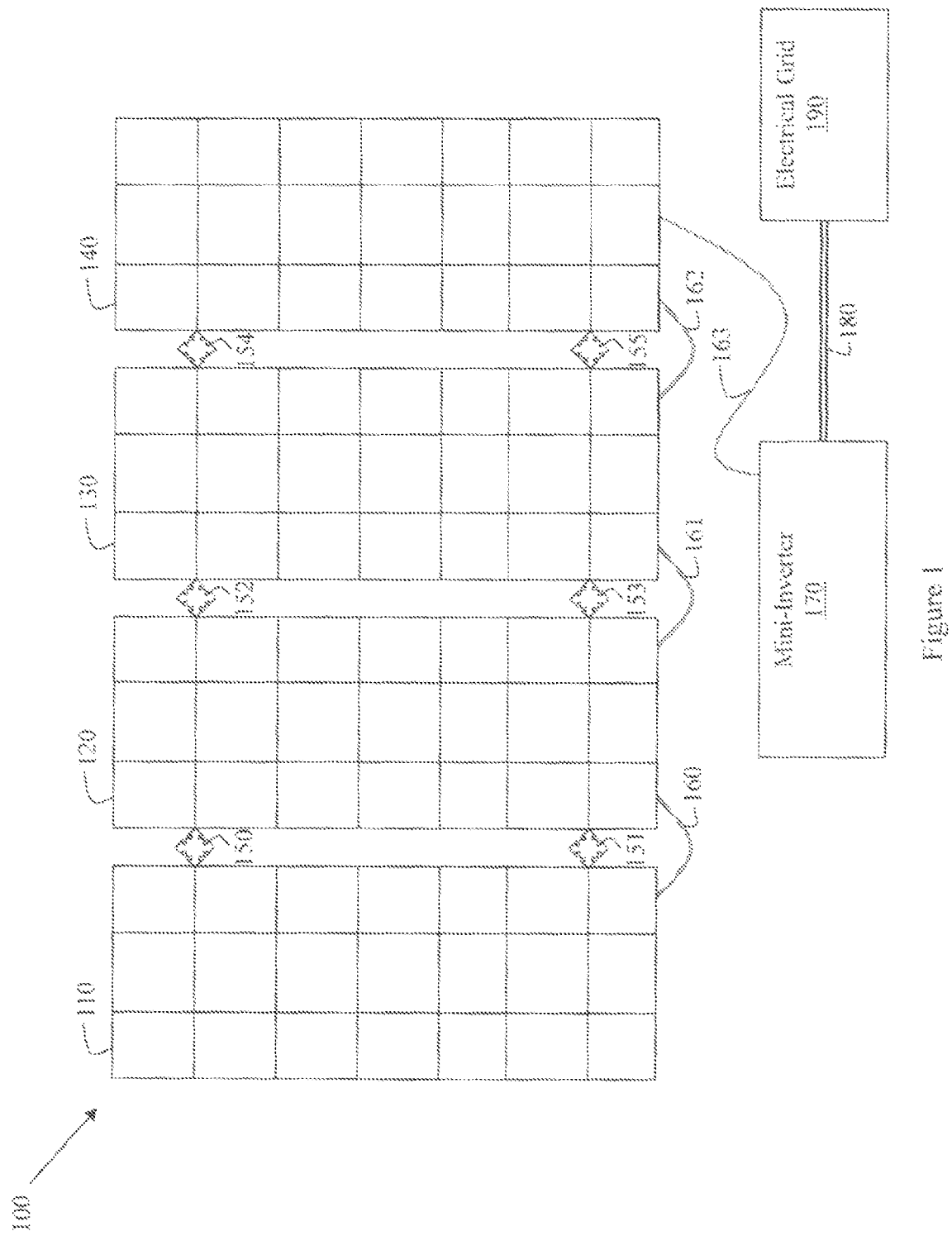
FIG. 1 illustrates an example prefabricated solar array system.

Example apparatus and methods provide a prefabricated solar array system. The prefabricated solar array system includes a plurality of solar panels. For example, the prefabricated solar array system may include four solar panels. However, one of ordinary skill in the art will recognize that more or fewer solar panels may be used. The number of solar panels in the prefabricated solar array system may be based on the size of the site where the panels will be installed, the method of installation, the amount of available labor, or the desired amount of power generation. Prefabricating the solar array reduces building costs for the solar array system and reduces the cost associated with shipping and installing the solar array system. Furthermore, adding prefabricated elements to solar array system reduces the amount of setup and testing required to increase the output of the solar array system.

In one embodiment, the solar panels are connected to one another using locking hinges. The locking hinges may be affixed to the solar panels during fabrication of the solar array system. The locking hinges allow the solar panels to be folded on top of each other in a stacked manner. Therefore, the plurality of solar panels can be folded on top of one another so that the dimension of the solar array system as folded is approximately the width and length of an individual solar panel and the height of an individual solar panel times an integer n, where n is the number of solar panels in the solar array system. Folding the panels reduces the size for shipping and installation and keeps the panels together so that the solar array system can be shipped as a single unit.

In one embodiment, rather than attempting to match panel output onsite or having to accept impedance mismatched panels, the solar panels' outputs are matched during fabrication. Matching the solar panels in the solar system array increases the power transfer of the solar array. Typically, solar panels do not provide the same amount of power. Although solar panels are fabricated with detailed specifications, individual solar panels vary due to minute differences in construction (e.g., variances in material that are within allowed tolerances). Small differences in fabrication can cause differences in the output capacity of an individual solar panel. Manufacturer tolerances on panel output are typically +/−5%. Therefore, design characteristics may cause a mismatch between solar panels. It is convenient to deal with the resulting mismatch when the solar array system is being assembled.

Conventionally, the output of the solar array system is determined by the least efficient solar panel due to impedance mismatch. Accordingly, the solar panels in the solar array system should have similar output capability. To this end, the output of the individual solar panels may be measured during fabrication and placed in solar array systems with other panels of similar outputs. This also reduces the amount of labor and testing that would otherwise need to be done in the field.

The relationship, between the solar panels in the solar array system is further complicated by environmental factors. For the solar array system to achieve improved power generation from the solar panels, the solar array system considers environmental factors (e.g., amount of solar irradiation, temperature of the solar panel). The solar array system manages the environmental factors by applying maximum power point tracking (MPPT). MPPT is a technique that solar inverters use to get the maximum possible output power from a solar array. Based on the outcome of MPPT a load is applied to the solar array system. Conventionally, the output power of a solar array is limited by the least efficient solar panel, because the series nature of the panel interconnection causes the electrical current to be constant through all the panels, and is determined by the panel generating the lowest current in the system (e.g., the least efficient panel). MPPT is determined for the solar array based, at least in part on, the reduced system current, and hence the solar panels in the solar array system receive the load proportional to the reduced system power.

In one embodiment, the solar panels have individual microinverters. The output of individual microinverters is wired together in parallel. In this manner the individual microinverters are wired to a common trunk line rather than being wired to one another. This reduces the amount of expensive DC cabling and cable conduits that are necessary. In another embodiment, the panels may be wired to one another in series and may be arranged in a prefabricated array. The prefabricated array may be wired to a mini-inverter. Although the panels being wired in series limits the output as a function of the least performing panel, prefabrication allows the individual panels to be impedance matched causing the panels to be well matched in terms of efficiency. When the panels are impedance matched, the power produced is not limited due to panel variations and improved power output is achieved. Because the panels of the prefabricated array are in close proximity to each other, the ambient variations between panels are reduced.

The mini-inverter also converts the DC variable output power of the solar panels in the solar array system into alternating current (AC) power. Cabling from the solar panels to the mini-inverter is DC cabling because the solar panels generate DC power. Power from the solar panels is converted because typical electrical grids (e.g., residential grids, commercial grids, industrial grids) operate using AC. Therefore, to make the power useful for consumption, the power is converted to AC. The cabling from a mini-inverter to the electrical grid is AC cabling. AC wiring may be attractive because AC wiring does not necessarily have to be run in conduits. Additionally, AC wiring may be more efficient at transferring power of a distance than DC wiring of the same gauge. Thus, the power loss for a given run of cable will be less for AC wiring than for DC wiring of the same gauge.

In one embodiment the panels may be wired to a DC to DC converter. The DC to DC converter performs MPPT. The impedance the individual solar panels have is the correct impedance to maximize the output of the individual solar panels. However the output of a DC to DC converter is DC power. To be useful in an electrical grid the output should be AC. Accordingly, a mini-inverter can be used down line to convert the DC output to AC power.

Since the solar array system is prefabricated the solar panels do not have to be individually wired in the field. Instead, the solar panels of the solar array system can be wired together in a string during the prefabrication process. Stringing together the solar panels in the solar array system reduces the amount of cabling needed for installation and the amount of labor performed in the field.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

FIG. 1 illustrates an example prefabricated solar array system 100 that includes solar panels 110, 120, 130, and 140. The solar panels 110, 120,130, and 140 are photovoltaic cells that use solar radiation to generate power. In one embodiment, the solar panels 110, 120, 130, and 140 may be 1.5 meters by 1.0 meter and weigh approximately 40 pounds. One of ordinary skill in the art will recognize that the solar panels 110, 120, 130, and 140 may be larger or smaller than the example dimensions. Additionally, the solar panels 110, 120, 130 and 140 may vary size with respect to one another. The solar panels 110, 120, 130, and 140 may be impedance matched during the fabrication, when the solar panels 110, 120, 130, arid 140 are grouped. The solar panels 110, 120, 130, and 140 can be grouped together in the fabrication process.

The solar panels 110, 120, 130, and 140 may be mechanically connected to one another using locking hinges. In one embodiment, solar panel 110 is mechanically connected to solar panel 120 with locking hinges 150 and 151. Solar panel 120 is mechanically connected to solar panel 130 with locking hinges 152 and 153. Solar panel 130 is mechanically connected to solar panel 140 with locking hinges 154 and 155. One of ordinary skill in the art will understand that more or fewer locking hinges may be used to mechanically connect the solar panels. In one embodiment the solar panels 110, 120, 130, and 140 may be attached to a solar rack by the locking hinges 150,151, 152, 153, 154, and 155. The locking hinges 150, 151, 152, 153, 154, and 155 may be affixed to the rack in a manner that allows the rack to be folded with the solar panels 110, 120, 130, and 140.

Locking hinges 150, 151, 152, 153, 154, and 155 are constructed to allow solar panels 110, 120, 130, and 140 to be folded on top of one another. For example, solar panel 110 may pivot about locking hinges 150 and 151 to lay on top of solar panel 120. Solar panel 140 may pivot about locking hinges 154 and 155 to lay on top of solar panel 130. Folded solar panels 110 and 120 may pivot about locking hinges 152 and 153 to lay on top of folded solar panels 130 and 140.

In addition to solar panels 110, 120, 130, and 140 being mechanically attached to one another, the solar panels 110, 120, 130, and 140 may be electrically connected to one another. Specifically, the solar panels 110, 120, 130, and 140 are wired to one another using DC cabling. Solar panel 110 is electrically connected to solar panel 120 with DC cable 160. Solar panel 120 is electrically connected to solar panel 130 with DC cable 161. Solar panel 130 is electrically connected to solar panel 140 with DC cable 162. Solar panels 110, 120, 130, and 140 are strung together by DC cables 160, 161, and 162. Furthermore, DC cabling 160, 161, and 162 is wired to the respective solar panels 110, 120, 130, and 140 during the prefabrication process to reduce the number of post manufacture connection made in the field.

The mini-inverter 170 is connected to solar panel 140 with DC cable 163. The mini-inverter converts DC power generated by solar panels 110, 120, 130, and 140 into AC power that can be transferred to an electrical grid 190 across an AC cable 180. In addition to converting DC power to AC power, the mini-inverter 170 uses MPPT to increase the power received from the solar panels 110, 120, 130, and 140 so that the output of the system is based on the maximum available power from each of the solar panels 110, 120, 130, and 140. One of ordinary skill in the art will appreciate that the solar panels can be connected to one another and to the mini-inverter in different variations.

Figure 2:
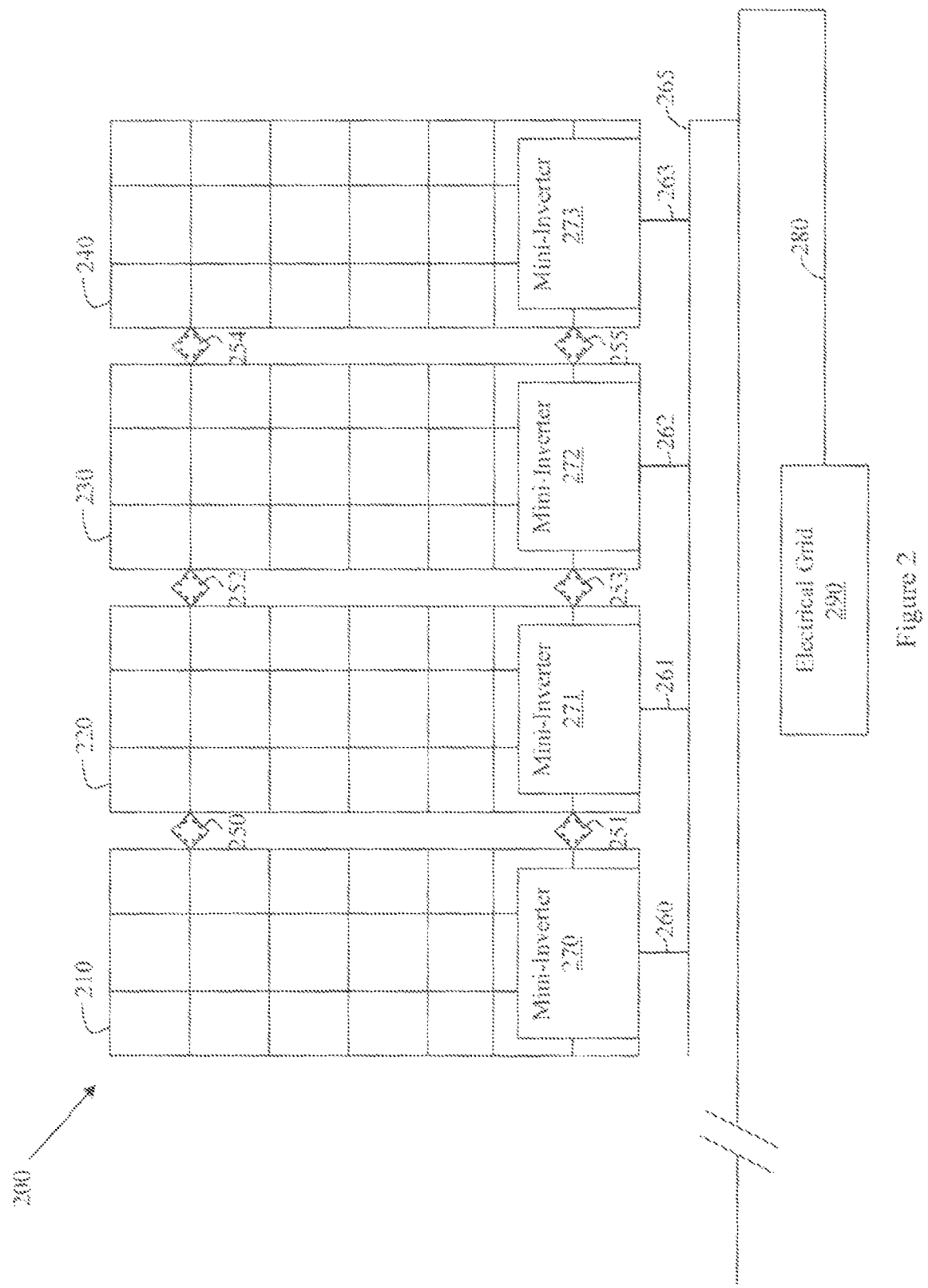
FIG. 2 illustrates an example prefabricated solar array system.

FIG. 2 illustrates an example prefabricated solar array system where solar panels 210, 220, 230, and 240 are associated with mini-inverters. Specifically, mini-inverter 270 is electrically connected to solar panel 210. The mini-inverter 270 converts the DC power generated by solar panel 210 into AC power. The mini-inverter 270 may be electrically connected to the solar panel 210 and not require DC cabling between the solar panel 210 and mini-inverter 270. For example, the mini-inverter 270 may be hard wired to the solar panel 210. The mini-inverter 270 also performs MPPT for solar panel 210.

Similarly, mini-inverter 271 is electrically connected to solar panel 220. The mini-inverter 271 performs MPPT for solar panel 220. The power generated by solar panel 220 is transmitted to the electrical grid 290 by the AC cable 261. A mini-inverter 272 is electrically connected to solar panel 230. The mini-inverter 272 performs MPPT for solar panel 230. The power generated by solar pane) 230 is transmitted to the electrical grid 290 by the AC cable 262. A mini-inverter 273 is electrically connected to solar panel 240. The mini-inverter 273 performs MPPT for solar panel 240. The power generated by solar panel 240 is transmitted to the electrical grid 290 by the AC cable 263.

The mini-inverters 270, 271, 272, and 273 are wired in parallel to a first trunk line 265 by AC cables 260, 261, 262, and 263 respectively. For example, the mini-inverter 270 is connected to the first trunk line 265 by AC cable 260. The first trunk line 265 is wired to a grid trunk line 280. In one embodiment, a second solar array of solar panels may be wired to a second trunk line that is connected to the electrical grid 290 by grid trunk line 280. Electrical grid 290 may be a conventional electrical grid (e.g., residential grid, commercial grid, industrial grid) that operates using AC power. In one embodiment, micro-inverters 270, 271, 272, and 273 are wired, by AC cables 260, 261, 262, and 263 respectively, directly to the grid trunk line 280.

The locking hinges 250, 251, 252, 253, 254, and 255 support the weight of the solar panels 210, 220, 230, and 240. The locking hinges 250, 251, 252, 253, 254, and 255 may include one of but is not limited to a triple locking hinge, plated locking hinge, side rack locking hinge, self-locking hinge, or drop lock joint hinge. One of ordinary skill in the art will recognize that numerous types of hinges may be used to allow the solar panels to be folded on one another. The locking hinges 250, 251, 252, 253, 254, and 255 may be fastened to their respective solar panels 210, 220, 230, and 240 using a fastening mechanism (e.g., screws, nails, adhesive, clamps). Alternatively, the locking hinges 250, 251, 252, 253, 254, and 255 attach the solar panels 210, 220, 230, and 240 to a solar rack, The locking hinges 250, 251, 252, 253, 254, and 255 may be configured to allow the solar array system to be folded, including the solar rack.

Figure 3:
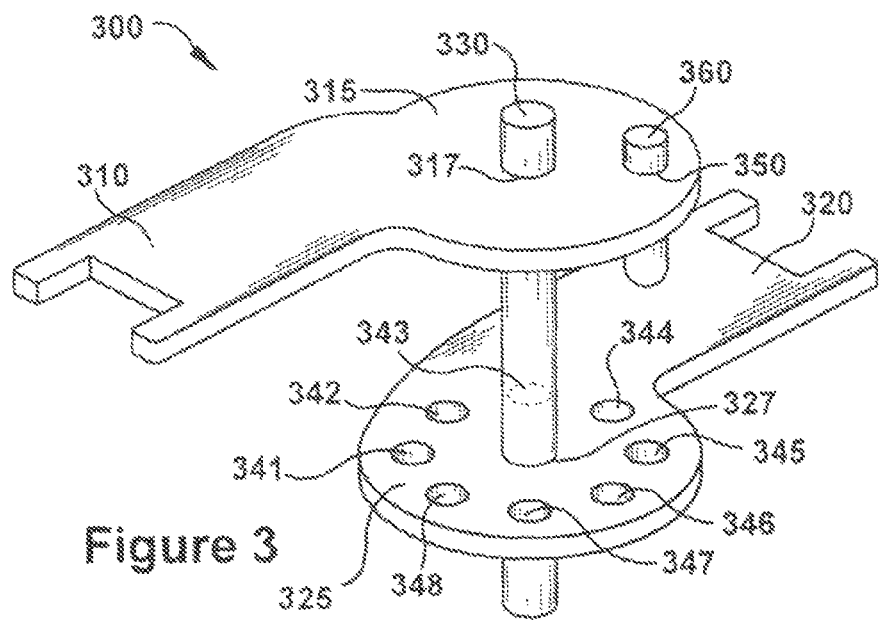
FIG. 3 illustrates an exploded view of a locking hinge associated with a prefabricated solar array system.

FIG. 3 illustrates an exploded view of an example locking hinge. Locking hinge 300 comprises a first arm 310 fastened to a first disk 315. The first arm 310 may be fastened to the first disk 315 with a fastener (e.g., adhesive, clamp, bracket, screw, bolt). Alternatively, the first arm 310 and the first disk 315 may be fabricated as a single unit. The first arm 310 is configured to be attached to a solar panel. The first arm 310 may be attached to the solar panel with a fastener (e.g., adhesive, clamp, bracket, screw, bolt).

In one embodiment, locking hinge 300 comprises a second arm 320 fastened to a second disk 325. The second arm 320 may be fastened to the second disk 325 with a fastener (e.g., adhesive, clamp, bracket, screw, bolt). Alternatively, the second arm 320 and the second disk 325 may be fabricated as a single unit. The second arm 320 is configured to be attached to another solar panel. The second arm 320 may be attached to the other solar panel with a fastener (e.g., adhesive, clamp, bracket, screw, bolt).

The first disk 315 has a first cutout 317, and the second disk 325 has a second cutout 327. The first cutout 317 and the second cutout 327 are located on their respective disks so that the first cutout 317 and the second cutout 327 are in alignment. An axle 330 configured to pass through the first cutout 317 and the second cutout 327 may act as a pivot point for the first disk 315 and the second disk 325. Thus, the first disk 315 and the second disk 325 rotate about axle 330.

The second disk 325 has a set of openings 341-348. The set of openings 341-348 may pass through the second disk 325 or the set of openings 341-348 may cut into a portion of the second disk 325 without passing through the second disk 325. The first disk 315 is configured with an opening 350. The opening 350 is configured to receive a locking dowel 360. The locking dowel 360 passes through the opening 350 and is seated in one of the set of openings 341-348 in the set of cutouts.

The position of the first arm 310 and the second arm 320 is based, at least in part, on the Opening of the set openings 341-348 that the locking dowel 360 passes through. For example, if the locking dowel 360 passes through opening 341, the first arm 310 and the second arm 320 are aligned. If the locking dowel 360 passes through opening 344, the first arm 310 and the second arm 320 extend in opposite directions. Thus, the position of the solar panels attached to the first arm 310 and the second arm 320 is dependent on the position of locking dowel 360 in conjunction with a set of openings 341-348. One of ordinary skill in the art will appreciate that in addition to using a locking dowel 360 in conjunction with a set of openings 341-348 there are alternative means for locking a locking hinge. For example, the locking hinge may be held in position by bracket, tongue and grove notching, hydraulics, or pins.

By passing through the opening 350 in the first disk 315 and being seated in one of the set of openings 340-347 of the second disk 325, the locking dowel 360 also prevents rotation of the first disk 315 and the second disk 325 about the axle 330. Accordingly, the locking dowel 360 locks the locking hinge in place. Therefore, the solar panels maybe locked in an unfolded or folded position.

Figures 4A, 4B:
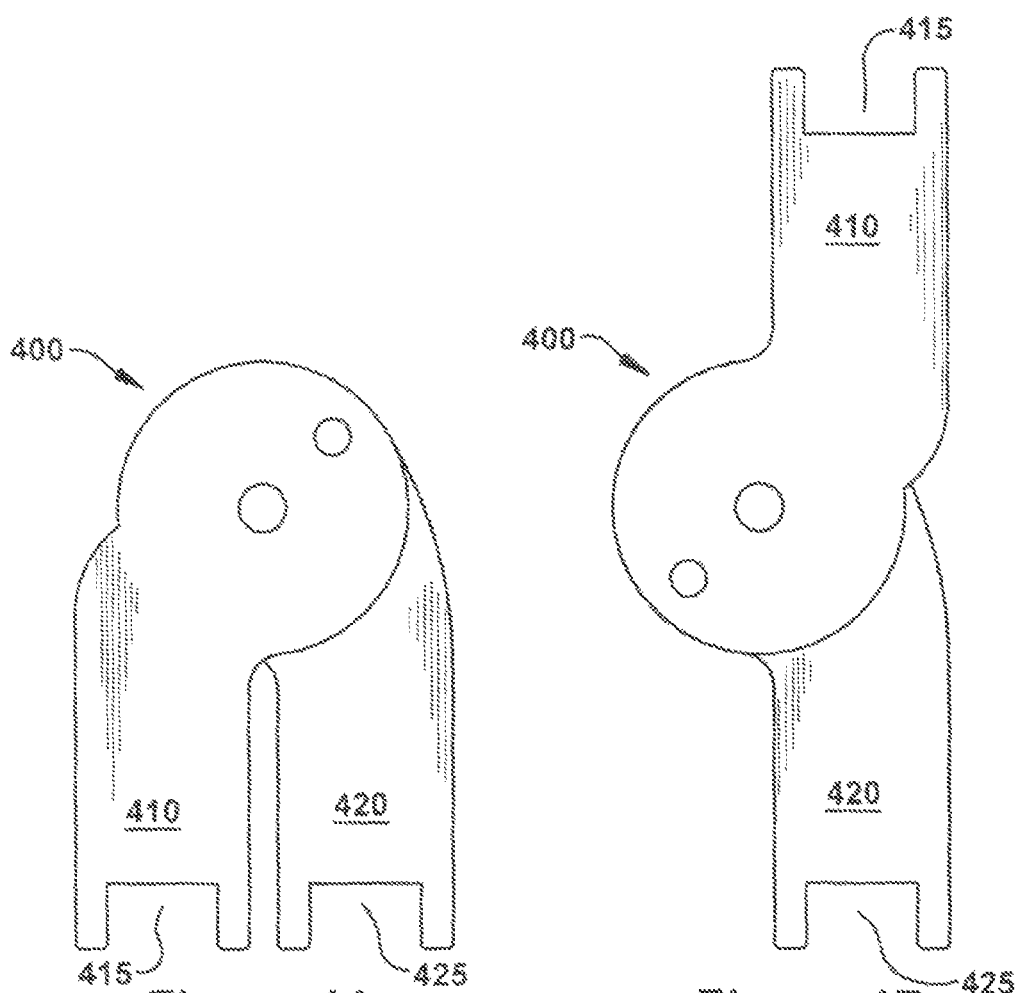
FIG. 4A illustrates a side view of a locking hinge associated with a prefabricated solar array system in a folded position.
FIG. 4B illustrates a side view of a locking hinge associated with a prefabricated solar array system in an unfolded position.

FIG. 4A illustrates a side view of a locking hinge 400 associated with a prefabricated solar array system in a folded position. The locking hinge 400 has a first arm 410 with a first notch 415 and a second arm 420 with a second notch 425. The first notch 415 is configured to receive a solar panel and the second notch 425 is configured to receive another solar panel. Thus, in the folded position, locking hinge 400 pulls the solar panels together so that the solar panels are laying on top of one another.

FIG. 4B illustrates a side view of a locking hinge 400 associated with a prefabricated solar array system in an unfolded position. The locking hinge 400 has a first arm 410 with a first notch 415 and a second arm 420 with a second notch 425. The first notch 415 is configured to receive a solar panel and the second notch 425 is configured to receive another solar panel. Thus, in the folded position, locking hinge 400 pushes the solar panels apart so that the solar panels are laying side by side one another.

While example apparatus have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A solar array system, comprising:
    a plurality of solar panels,
        where a member of the plurality of solar panels is fabricated with at least one mini-inverter to perform maximum power point tracking (MPPT) and to apply a load to the member,
        where members of the plurality of solar panels are electrically connected to an electrical grid with AC cabling,
        where members of the plurality of solar panels are selected for inclusion in the plurality of solar panels based, at least in part, on a measurement of the output of the members during fabrication and on impedance matching of the members during fabrication,
        where the at least one mini-inverter of the solar panel is configured to convert direct current (DC) power generated by the solar panel to alternating current (AC) power, and
        where the plurality of solar panels are fabricated together as a unit; and
    a plurality of locking hinges, where the locking hinges are configured to allow the plurality of solar panels to be grouped together and folded.

2. The solar array system of claim 1, where the at least one mini-inverter is hard wired to the solar panel.

3. The solar array system of claim 1, where the locking hinges are configured to be locked when the plurality of solar panels are folded.

4. The solar array system of claim 1, where the plurality of solar panels in the folded position have a length associated with an individual solar panel, a width associated with an individual panel, and a height associated with the plurality of solar panels when stacked.

5. The solar array system of claim 1, where the locking hinges are configured to be locked when the plurality of solar panels are unfolded.

* * * * *